United States Patent

Itoh et al.

[11] Patent Number: 5,228,369
[45] Date of Patent: Jul. 20, 1993

[54] METHOD OF SURFACE MACHINING FOR SUBSTRATE OF ELECTROPHOTOGRAPHIC PHOTORECEPTOR

[75] Inventors: Masao Itoh; Sunao Kawada; Masataka Inagi; Takayoshi Hashimoto; Toyotsugu Itoh, all of Hachioji, Japan

[73] Assignee: Konica Corporation, Tokyo, Japan

[21] Appl. No.: 806,010

[22] Filed: Dec. 9, 1991

[30] Foreign Application Priority Data

Dec. 28, 1990 [JP] Japan ................ 2-417446

[51] Int. Cl.$^5$ ................ B23B 1/00
[52] U.S. Cl. ................ 82/1.11; 51/165.73; 51/322; 82/50; 82/900; 407/11; 407/120; 408/56; 409/136
[58] Field of Search ............ 82/1.11, 900, 173, 50; 407/11, 120; 51/165.73, 322, 266; 409/135, 136; 408/56, 59

[56] References Cited

U.S. PATENT DOCUMENTS

| | | | |
|---|---|---|---|
| 1,513,813 | 11/1924 | Hill et al. | 51/165.73 |
| 2,335,100 | 11/1943 | Bauer | 51/165.73 |
| 2,427,064 | 9/1947 | Moul | 51/165.73 |
| 2,924,873 | 2/1960 | Knowles | 82/152 |
| 3,027,625 | 4/1962 | Milstead | 407/11 |
| 4,471,579 | 9/1984 | Bovensiepen | 51/165.73 |
| 4,502,459 | 3/1985 | Dyer | 51/165.73 |

FOREIGN PATENT DOCUMENTS

| | | | |
|---|---|---|---|
| 160001 | 9/1983 | Japan | 408/56 |
| 20840 | 2/1985 | Japan | 409/135 |
| 307463 | 12/1988 | Japan . | |
| 481412 | 12/1975 | U.S.S.R. | 51/165.73 |
| 601145 | 4/1978 | U.S.S.R. | 51/165.73 |
| 835712 | 6/1981 | U.S.S.R. | 82/50 |

Primary Examiner—Z. R. Bilinsky
Attorney, Agent, or Firm—Frishauf, Holtz, Goodman & Woodward

[57] ABSTRACT

In machining a substrate surface of a photoreceptor by the use of a cutting machine which supplies cutting lubricant from a reservoir to a cutting tool of the cutting machine, the method comprises a measurement of a cutting tool temperature by a sensor and a control of both the temperature of cutting lubricant and a flow rate thereof. The control is responsive to the cutting tool temperature and suppresses a temperature fluctuation of the cutting tool.

6 Claims, 4 Drawing Sheets

METHOD OF SURFACE MACHINING FOR SUBSTRATE OF ELECTROPHOTOGRAPHIC PHOTORECEPTOR

BACKGROUND OF THE INVENTION

The present invention relates to a method of surface machining for a substrate of an electrophotographic photoreceptor, and more particularly, to a method of surface machining of a substrate made of aluminum of an electrophotographic photoreceptor.

In an electrophotographic copying machine, a digital copier, a laser printer and others, an electrophotographic photoreceptor wherein a light-sensitive layer is provided on a substrate of a rotary drum-shaped electrophotographic photoreceptor (hereinafter referred to simply as "substrate") is commonly used. As a material of the substrate forming such electrophotographic photoreceptor, materials of an aluminum type are preferably used from the viewpoint of low cost, lightness and easy machining. A rotary drum-shaped substrate made of the aluminum type material is generally made by turning the surface of a cylindrical material for finishing, and cutting liquid is usually used for the cutting work of turning. The cutting liquid is used for the purpose of cooling, lubricating and cleaning, and for that purpose, petroleum, polybutene, kerosene and white kerosene are used.

Actual technologies related to a method of surface machining for a substrate of an electrophotographic photoreceptor which have been suggested are as follows.

(1) A technology wherein a substrate of an electrophotographic photoreceptor is machined by the use of cutting oil containing 1.0% by weight or less of an oiliness improver and/or extreme-pressure additive (Japanese Patent Publication Open to Public Inspection No. 307463/1988 (hereinafter referred to as Japanese Patent O.P.I. Publication).

(2) A technology wherein the surface of a substrate of an electrophotographic photoreceptor is made of an aluminum alloy containing magnesium, silicon, copper and titanium each within a specific range of values is machined by a cutting tool having a rounded shape at its cutting portion (Japanese Patent O.P.I. Publication No. 86151/1989).

(3) A technology wherein an alloy containing silicon and iron each within a specific range of values is used for a substrate of an electrophotographic photoreceptor (Japanese Patent O.P.I. Publication No. 86152/1989).

(4) A technology wherein the surface of a substrate of an electrophotographic photoreceptor made of an aluminum alloy containing magnesium, silicon, and copper each within a specific range of values is machined by a cutting tool having a rounded shape at its cutting portion (Japanese Patent O.P.I. Publication No. 86153/1989).

(5) A technology wherein an alloy containing silicon, magnesium and iron each within a specific range of values is used for a substrate of an electrophotographic photoreceptor (Japanese Patent O.P.I. Publication No. 86154/1989).

(6) A technology wherein an alloy containing magnesium, silicon, copper and titanium each within a specific range of values is used for a substrate of an electrophotographic photoreceptor (Japanese Patent O.P.I. Publication No. 86155/1989).

(7) A technology wherein an alloy containing silicon, iron, and magnesium, each within a specific range of values and containing other metals within a specified range of values is used for a substrate of an electrophotographic photoreceptor (Japanese Patent O.P.I. Publication No. 123245/1989)

(8) A technology employing a surface machining apparatus which is composed of a lathe unit, a high-pressure liquid jetting unit and a conveyance unit for a substrate of an electrophotographic photoreceptor, and is capable of turning and high-pressure jetting successively and automatically (Japanese Patent O.P.I. Publication No. 152642/1987)

(9) A technology employing a specific cutting liquid supplying nozzle apparatus having a spindle head on which a spindle equipped with a rotary tool having oil holes and a rotary tool having no oil holes is supported rotatably (Japanese Patent O.P.I. Publication No. 152642/1987).

(10) A technology wherein high pressure water is jetted onto the surface of a substrate of an electrophotographic photoreceptor from a nozzle connected to a source of high-pressure water supply while the surface of the substrate is scanned by the nozzle, thereby the surface of the substrate is matted to the predetermined surface roughness (Japanese Patent O.P.I. Publication No. 264764/1988).

In the past, however, the supply of cutting liquid was unstable, resulting in insufficient cooling of a cutting tool which shortened its life, because an operator used his experience and head for supplying cutting liquid. In addition to that, a temperature of cutting liquid was unstable, and change of ambient temperature and heat generated from a surface machining apparatus adversely affected dimensions of the surface-machined substrate, which has been a problem.

SUMMARY OF THE INVENTION

An object of the invention is to provide a method of surface machining for a substrate of an electrophotographic photoreceptor capable of extending the life of a cutting tool and stabilizing dimensions of the surface-machined substrate.

A method of surface machining of a substrate of an electrophotographic photoreceptor comprising when turning the surface of the substrate with a cutting tool while supplying cutting liquid to the surface of the substrate made of a material of an aluminum type for an electrophotographic photoreceptor, controlling the temperature and amount of supply of the aforementioned cutting liquid based on detection signals of a temperature sensor that is provided for detecting the temperature of the aforementioned cutting tool, so that the temperature of the cutting tool mentioned above may be kept constant.

DETAILED DESCRIPTION OF THE PREFERRED EMBODIMENTS

In the method of surface machining of the invention, when turning the surface of a substrate made of material of an aluminum type of an electrophotographic photoreceptor with cutting tool 3 made of sintered monocrystal diamond or of sintered polycrystal diamond while supplying cutting liquid 2 to the surface of the substrate, both the temperature and the amount of supply of the cutting liquid 2 are controlled based on detection signals of temperature sensor 4 that is provided for detecting the temperature of cutting tool 3, so that the temperature of cutting tool 3 may be kept constant. The numeral 5 is a cutting liquid tank, 6 is a temperature control unit, 7 is a control unit for the amount of supply of cutting liquid, 8 is an amplifying unit and 9 is a controller.

Figure 1:
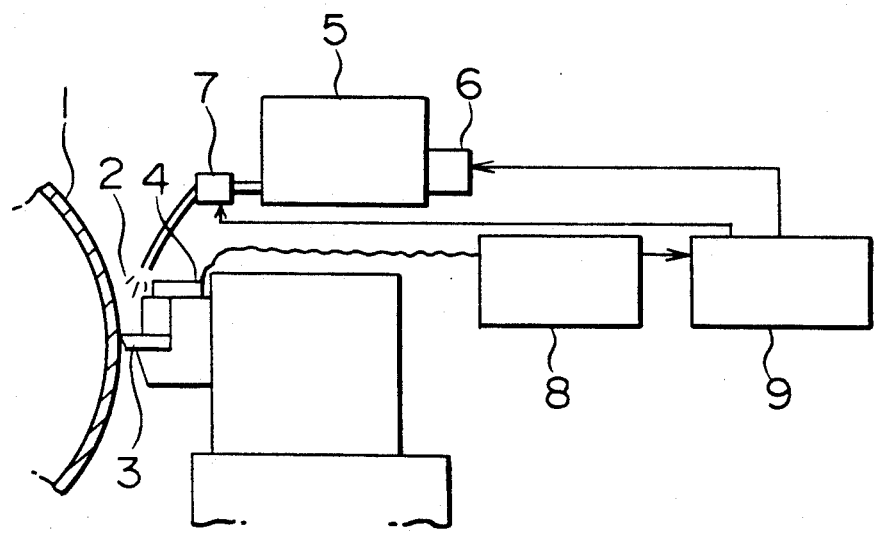
FIG. 1 is an illustration showing the outline of a method of surface machining of the invention.
Figure 2:
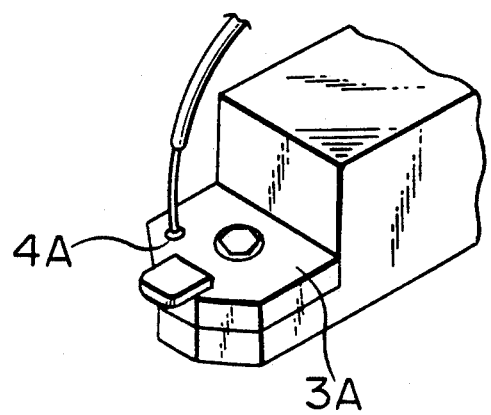
FIG. 2 is a perspective view for illustration of an example of how a temperature sensor is provided.
Figure 3:
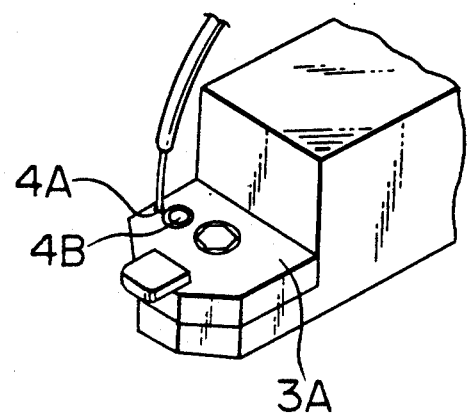
FIG. 3 is a perspective view for illustration of another example of how a temperature sensor is provided.
Figure 4:
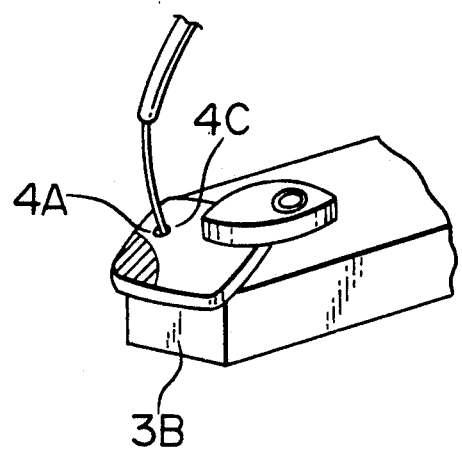
FIG. 4 is a perspective view for illustration of further example of how a temperature sensor is provided.
Figure 5:
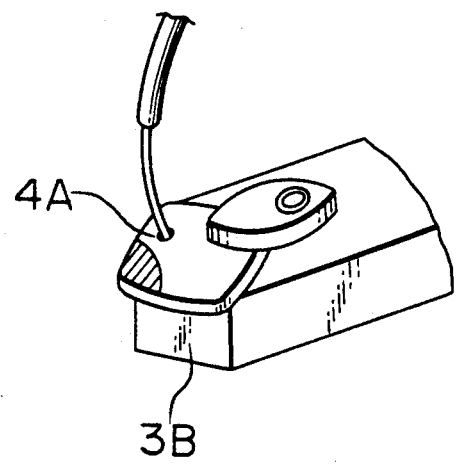
FIG. 5 is a perspective view for illustration of still further example of how a temperature sensor is provided.

As temperature sensor 4, a thermocouple is preferably used, and actual examples used commonly include construction wherein thermocouple 4A is welded on the tip of tool shank 3A as shown in FIG. 2, construction wherein thermocouple 4A is fixed on the tip of tool shank 3A by means of screw 4B as shown in FIG. 3, construction wherein thermocouple 4A is cemented on the tip of tool chip 3B by means of heat conductive cement 4C as shown in FIG. 4 and construction wherein thermocouple 4A is welded on the tip of tool chip 3B as shown in FIG. 5.

Detection signals from temperature sensor 4 are sent to controller 9 after being amplified by amplifier 8. Control signals are supplied from the controller 9 to temperature control unit 6 and to control unit for the amount of supply of cutting liquid 7 so that the detection signals from the temperature sensor 4 may be a predetermined value, thus the feed back control is performed. Namely, both the temperature and the amount of supply of cutting liquid are controlled based on the detection signals from the temperature sensor 4, resulting in a controlled temperature at the tip of cutting tool 3. Thus, deterioration of the cutting tool caused by over heat can be prevented, and the temperature on the surface of a substrate of an electrophotographic photoreceptor that is being machined is kept constant and thereby dimensions of the substrate can be stabilized.

Materials of an aluminum type to be used include A1070, A1100, A3003, A5005, A5805 and A6063 all provided in JIS (Japanese Industrial Standards). The shape of a substrate is not limited in particular, and it may either be of a rotary drum type or be of an endless sheet belt type.

With regard to a cutting tool, the one made of sintered polycrystal diamond is used for rough turning, while, a flat tool and a rounded tool made of sintered monocrystal diamond and sintered polycrystal diamond is used for finish turning. A radius of curvature R at the nose of the rounded tool to be used is 10–30 mm.

With regard to the conditions for surface machining, the preferable conditions for rough turning include the number of revolutions of a spindle of 2000–6000 r.p.m., depth of cut of 0.1–0.2 mm, and feed per revolution of 0.15–0.2 mm/rev, while those for finish turning include the number of revolutions of a spindle of 2000–6000 r.p.m., depth of cut of 20 $\mu$m, and feed per revolution of 0.15–0.2 mm/rev. Incidentally, since the number of revolutions of a spindle depends upon an outside diameter of a cylindrical substrate, it can not be determined unconditionally.

With regard to cutting liquid, though it is not limited in particular, the ones wherein oiliness improvers and-/or extreme-pressure additives, are contained at a rate of 1.0% by weight or less in white kerosene, "Daphne cut FS-5", "Daphne cut HS-5" or "Daphne cut 6930" (all manufactured by Idemitsu Kosan Co., Ltd.) are given. In addition, . . . , some kinds of alcohol, aqueous solutions of surfactants and/or water-soluble organic solvents, water-soluble organic solvents (containing no water), and water are given. Especially from the viewpoint of cooling effect of cutting liquid, it is preferable to use surface active agents and/or aqueous solution of water-soluble organic solvent, or water. With regard to the supply of cutting liquid to the surface of a substrate, it is preferable to use, for example, "Magic-cut" made by Fuso Seiki Co., Ltd. or the like which converts cutting liquid into the form of a mist.

The substrate whose surface has been machined is then subjected to a cleaning step. The cleaning method is not limited in particular. For example, there may be given a method wherein the substrate is cleaned through the supersonic cleaning, then cleaned by a brush and cleaned again through the supersonic cleaning. As cleaning liquid, trichloroethane or pure water may be used. After cleaning, the substrate is subjected to the drying step by means of steam.

The substrate of an electrophotographic photoreceptor whose surface has been machined by the method of the invention is used for composing an electrophotographic photoreceptor employed in an electrophotographic copying machine, a digital copier, a laser printer or the like. Such electrophotographic photoreceptor comprises the substrate having thereon an organic light-sensitive layer which includes a carrier generating layer and a carrier transport layer.

Concrete examples will be explained as follows, and the invention is not limited to the examples.

EXAMPLE 1

Based on the following conditions, the surface of a substrate was turned by a cutting tool while the surface of the substrate was being supplied with cutting liquid. Then, the substrate was cleaned and dried, thus the surface-machined substrate of an electrophotographic photoreceptor was obtained.

(1) Substrate

As a substrate made of an aluminum type material, the rotary-drum-shaped substrate made of A40S (6000 series) of Kobe Seiko-sho Co., Ltd. having an outside diameter of 60 mm and length of 273 mm was used. Incidentally, the A40S contains, in addition to aluminum, 0.55% by weight of magnesium, 0.12% by weight of silicon, 0.05% by weight of iron, 0.01% by weight of titanium, 0.01% by weight of zinc and 0.01% by weight or less of manganese.

(2) Cutting Liquid

Tap water having the specific resistance of 5 k$\Omega$/cm was used.

(3) Supply Amount and Temperature of Cutting Liquid

A thermocouple (a temperature sensor) was affixed on the tool shank by means of welding, and based on the detection signals from the thermocouple, the controller controlled the temperature control unit and the cutting liquid supply amount control unit so that the aforementioned detection signals may be kept constant in terms of value, through the feed-back control of cutting liquid supply amount and temperature.

(4) Machine Tool

A lathe for machining a substrate equipped with "Magic-cut" that is a sprayer device for cutting liquid (made by Fuso Seiki Col, Ltd.) modified to be capable of controlling the supply amount and temperature of cutting liquid was used.

(5) Cutting Tool

For rough turning, a cutting tool that is made of sintered polycrystal diamond with a particle size of 5 $\mu m$ and has a nose R of 3 mm was used.

For finish turning, a cutting tool that is made of sintered polycrystal diamond with a particle size of 0.5 $\mu m$ and has a nose R of 20 mm was used.

(6) Machining Conditions

For rough turning, the number of revolutions of a spindle of 3,000 r.p.m., the feed length per revolution of 0.2 mm and the depth of cut of 0.2 mm were employed.

For finish turning, the number of revolutions of a spindle of 3,000 r.p.m., the feed length per revolution of 0.2 mm/rev and the depth of cut of 20 $\mu m$ were employed.

Figure 6:
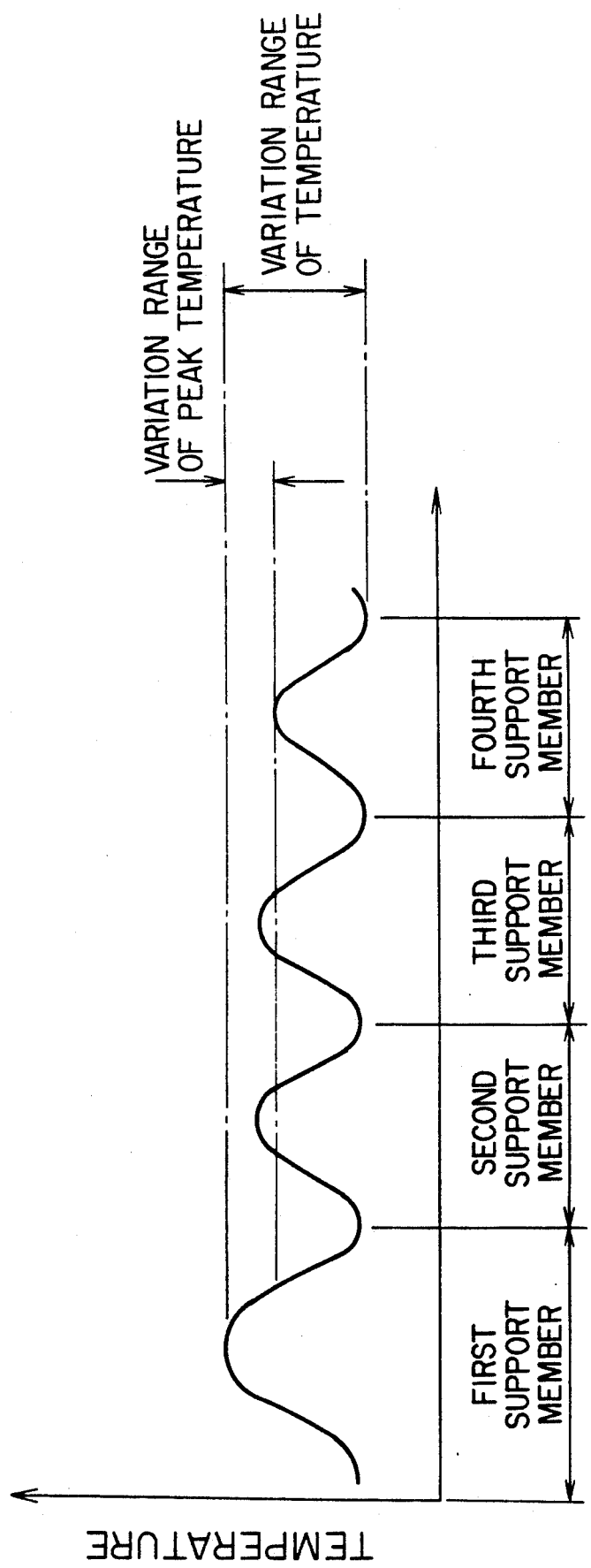
FIG. 6 is an illustration for a temperature variation range and a peak value range.

Under the conditions mentioned above, 1000 pieces in total of substrates for an electrophotographic photoreceptor were subjected to the tests of surface machining process, and the variation range of temperature and the variation range of peak temperature for the processing covering the first substrate up to the 1000th substrate were investigated. The temperature variation during a succesive machining of a plural number of substrate is shown in FIG. 6. In the figure, notations of "FIRST SUPPORT MEMBER" to "FOURTH SUPPORT MEMBER" respectively represent machining periods of the first substrate to the fourth base frame. The variation range of temperature was 25° C.–35° C. and that of peak temperature was 30° C.–35° C. Further, the change of outside diameters of the substrates for an electrophotographic photoreceptor was investigated, and the range was 80.003 $\mu m$–80.013 $\mu m$ (range of 10 $\mu m$). In addition, the number of substrates for an electrophotographic photoreceptor which may be machined by the same cutting tool was investigated, and the number was 3000 pieces.

COMPARATIVE EXAMPLE 1

Substrates for an electrophotographic photoreceptor in the quantity of 1000 pieces in total were subjected to the tests of surface machining process under the conditions identical to those in Example 1 excepting that the control by means of a temperature sensor was not conducted at all. The results showed that the variation range of temperature was 25° C.–50° C. and that of peak temperature was 40° C.–50° C., both of which represented lower accuracy than in Example 1. In addition, the variation of outside diameters of substrates for an electrophotographic photoreceptor was investigated, and it was 80.005 $\mu m$–80.025 $\mu m$ (range of 20 $\mu m$) which was lower than that in Example 1 in terms of accuracy. Further, the number of substrates for an electrophotographic photoreceptor which may be machined by the same cutting tool was investigated, and the number was 2000 pieces which represented a shorter life of the cutting tool than in Example 1.

As stated in detail above, the method for surface machining of the invention allows the tip of a cutting tool to be prevented from deterioration caused by its over-heat, resulting in the extension of a life of the cutting tool and in improvement of stability in dimensions of the substrates for an electrophotographic photoreceptor obtained after the surface machining.

What is claimed is:

1. In a method of machining a substrate surface of a photoreceptor by the use of a cutting machine, wherein a cutting lubricant is supplied from a reservoir to a cutting tool of the cutting machine, and the supplied cutting lubricant is poured onto an outer tip surface of the steps comprising:

sensing a cutting tool temperature with a sensor; and
simultaneously controlling both a supply rate of the cutting lubricant supplied from the reservoir and a temperature of the lubricant supplied from the reservoir, in response to the temperature sensed by said sensor, such that the supplied cutting lubricant is poured on an outer tip surface of the cutting tool, for cooling and lubricating the cutting tool and for maintaining a cutting temperature of the cutting tool constant.

2. In the method according to claim 1, wherein the photoreceptor comprises an aluminum alloy, further comprising cutting the aluminum alloy photoreceptor with said cutting tool having the constant temperature.

3. In the method according to claim 1, further comprising mounting said cutting tool on a lathe.

4. In the method according to claim 1, wherein said sensor comprises a thermocouple, and further comprising:

attaching the thermocouple to said cutting tool at a measuring point on said cutting tool.

5. A lathe turning machine for machining a surface of an aluminum alloy substrate of a photoreceptor for use in an electrophotographic apparatus, said lathe turning machine comprising means for supplying a cutting lubricant at a flow rate from a reservoir, and for pouring the supplied cutting lubricant onto an outer tip surface of a cutting tool, the lathe turning machine further comprising:

sensing means for sensing a cutting tool temperature; and
control means responsive to the cutting tool temperature sensed by said sensing means, for simultaneously controlling both a temperature of the cutting lubricant in the reservoir and the flow rate of said cutting lubricant that is poured onto the outer tip surface of the cutting tool so as to cool and lubricate the cutting tool and to substantially suppress a variation of the cutting tool temperature.

6. The lathe of claim 5, wherein said sensing means comprises a thermocouple that is attached to said cutting tool at a measuring point on said cutting tool.

* * * * *